(12) United States Patent
Shibata et al.

(10) Patent No.: US 9,206,890 B2
(45) Date of Patent: Dec. 8, 2015

(54) SWASH PLATE

(71) Applicant: TAIHO KOGYO Co., Ltd., Toyota-shi, Aichi (JP)

(72) Inventors: Masato Shibata, Toyota (JP); Kyohei Yamane, Toyota (JP); Shingo Goto, Toyota (JP)

(73) Assignee: TAIHO KOGYO CO., LTD. (JP)

( * ) Notice: Subject to any disclaimer, the term of this patent is extended or adjusted under 35 U.S.C. 154(b) by 0 days.

(21) Appl. No.: 14/387,869

(22) PCT Filed: Mar. 25, 2013

(86) PCT No.: PCT/JP2013/058583
§ 371 (c)(1),
(2) Date: Sep. 25, 2014

(87) PCT Pub. No.: WO2013/146682
PCT Pub. Date: Oct. 3, 2013

(65) Prior Publication Data
US 2015/0033884 A1    Feb. 5, 2015

(30) Foreign Application Priority Data

Mar. 29, 2012   (JP) .................................. 2012-077531

(51) Int. Cl.
*F01B 31/10*    (2006.01)
*F16H 23/00*    (2006.01)
(Continued)

(52) U.S. Cl.
CPC .............. *F16H 23/00* (2013.01); *F04B 27/086* (2013.01); *F04B 27/109* (2013.01);
(Continued)

(58) Field of Classification Search
CPC .............. F04B 27/109; F04B 39/0215; F05C 2253/12; F05C 2253/20; F16C 33/20; F16C 33/208; F16C 33/336696
USPC .......................................................... 92/155
See application file for complete search history.

(56) References Cited

U.S. PATENT DOCUMENTS

2002/0170425 A1  11/2002  Tarutani et al.
2002/0178904 A1  12/2002  Sugiura
(Continued)

FOREIGN PATENT DOCUMENTS

| JP | 2002021719 A | 1/2002 |
| JP | 2002317759 A | 10/2002 |
| JP | 2003042061 A | 2/2003 |
| JP | 2003184743 A | 7/2003 |

OTHER PUBLICATIONS

International Search Report for International application No. PCT/JP2013/058583; Date of mailing, Jun. 18, 2013; with English Translation.
(Continued)

*Primary Examiner* — Michael Leslie
(74) *Attorney, Agent, or Firm* — Cantor Colburn LLP

(57) ABSTRACT

This swash plate comprises a resin film layer formed on the front surface and the rear surface, and said resin film layer serves as the sliding surface which slides on a shoe. The inner periphery of the resin film layer is a tilted surface which a lubricant can easily cross over. In other words, angle θ1 is 10° or less and angle θ2 of the rising part is set to 20° or less, and when the lubricant is supplied from the inner periphery side of the swash plate, said lubricant easily crosses over said inner periphery which is a tilted surface, and is quickly supplied to the surface (the sliding surface) outside of said inner periphery. Because the lubricant is quickly supplied to the front surface and the rear surface (the sliding surface) of the swash plate, seizure of the swash plate can be prevented.

5 Claims, 5 Drawing Sheets

(51) Int. Cl.
  *F04B 39/02*  (2006.01)
  *F16C 33/66*  (2006.01)
  *F04B 27/10*  (2006.01)
  *F04B 27/08*  (2006.01)
  *F16C 17/04*  (2006.01)
  *F16C 33/20*  (2006.01)

(52) U.S. Cl.
  CPC ........ *F04B 27/1036* (2013.01); *F04B 27/1054* (2013.01); *F04B 39/0215* (2013.01); *F16C 17/04* (2013.01); *F16C 33/20* (2013.01); *F16C 33/6696* (2013.01); *F05C 2253/12* (2013.01); *F05C 2253/20* (2013.01)

(56) References Cited

U.S. PATENT DOCUMENTS

| | | |
|---|---|---|
| 2003/0005821 A1 | 1/2003 | Ota et al. |
| 2003/0121412 A1 | 7/2003 | Sugiura et al. |
| 2015/0033940 A1* | 2/2015 | Shibata et al. ................. 92/155 |

OTHER PUBLICATIONS

Written Opinion of the International Searching Authority corresponding to Application No. PCT/JP2013/058583; Date of mailing, Jun. 18, 2013; with English Translation.

* cited by examiner

SWASH PLATE

This is the U.S. national stage of application No. PCT/JP2013/058583, filed on Mar. 25, 2013. Priority under 35 U.S.C. §119(a) and 35 U.S.C. §365(b) is claimed from Japanese Application No. 2012-077531, filed Mar. 29, 2012, the disclosure of which is also incorporated herein by reference.

TECHNICAL FIELD

The present invention relates to a swash plate, more particularly, to a swash plate of a swash plate type compressor arranged with a coating layer serving as a sliding surface on a surface.

BACKGROUND ART

Conventionally, a swash plate formed with a resin film layer (coating layer) on a surface of a substrate whereby the resin film layer becomes a sliding surface has been proposed as a swash plate of a swash plate type compressor (for example Patent Literature 1 to Patent Literature 3). In this type of conventional swash plate, a swash plate rotated by rotary shaft slides with a shoe serving as a mating member when the swash plate rotates, lubricating oil is supplied from the inner peripheral side of the swash plate and the sliding parts of both members become lubricated.

CITATION LIST

Patent Literature

PTL 1: Japanese Laid Open Patent Publication No. 2002-317759
PTL 2: Japanese Laid Open Patent Publication No. 2003-42061
PTL 3: Japanese Laid Open Patent Publication No. 2003-184743

SUMMARY OF THE INVENTION

In the conventional swash plate arranged with a resin film layer as described above, when a lubricating oil is supplied to a sliding surface from the inner peripheral side of the swash plate, there is a problem whereby it is difficult for the lubricating oil to be supplied to the entire area of the sliding surface. That is, as is shown in FIG. 4 and FIG. 5, the conventional swash plate is formed with a resin film layer on the surface of the substrate, the swash plate of the conventional inner side end surface of the substrate, wherein an end surface of the substrate is exposed more on an inner side than an inner peripheral part of the resin film layer. Moreover, a cross section in a radial direction of the inner peripheral part of the resin film layer has a step which rises more than 40° with respect to the end surface of the substrate. More specifically, given a virtual straight line L1 which connects an inner edge which is a boundary with the end surface of the substrate in the inner peripheral part, and an outer edge which is a boundary with a sliding surface in the inner peripheral part, an angle θ1 of the virtual straight line L1 with the end surface of the substrate is 40° or more. Furthermore, an angle θ2 of a rising part which is an adjacent section of the inner edge of the inner peripheral part with the end surface of the substrate is an angle close to 90°. As a result, in the conventional swash plate, when the lubricating oil is supplied from the inner peripheral side and moves to the sliding surface in a circumferential direction outward along the end surface of the substrate on which the lubricating oil is exposed, the oil easily rebounds due to the step of the inner peripheral part of the resin film layer (see FIG. 5). As a result, in the conventional swash plate, there is a problem whereby the lubricating oil leaps over the inner peripheral part of the resin film layer and is not easily supplied to the sliding surface in a radial outward direction side. Therefore, the conventional swash plate has been pointed out as having a defect whereby seizure is easily caused due to insufficient lubrication.

Means for Solving the Problems

In view of the above circumstances, the present invention provides a swash plate including a disc-shaped substrate, and a coating layer applied to a surface of the substrate, the coating layer serving as a sliding surface sliding with a shoe, wherein an inner peripheral part in the coating layer serves as a tilted surface having an outer edge located in a radial outwards direction, the outer edge serving as an edge part on an inner peripheral part side of the sliding surface with respect to an inner edge serving as a boundary part with an end part of the substrate, the tilted surface has an angle θ1 formed by a virtual straight line connecting the inner edge and the outer edge with the end surface of the substrate and is set to 10° or less, and an angle θ2 formed by a rising part adjacent to the inner edge with the end surface is set to 20° or less, and an angle formed with the end surface of the substrate in any section of the tilted surface is less than 90°.

Effects of the Invention

According to this structure, the inner peripheral part of the coating layer server as the tilted surface as described above. As a result, when the lubricating oil is supplied from the inner peripheral side (inner peripheral side of the substrate) of the swash plate, the oil leaps the inner peripheral part which serves as the tilted surface without much obstacle, and is supplied to the outer side sliding surfaces. Therefore, it is possible to prevent insufficient lubrication on the sliding surface and thus seizure of the swash plate can be satisfactorily prevented.

DESCRIPTION OF EMBODIMENTS

Figure 1:
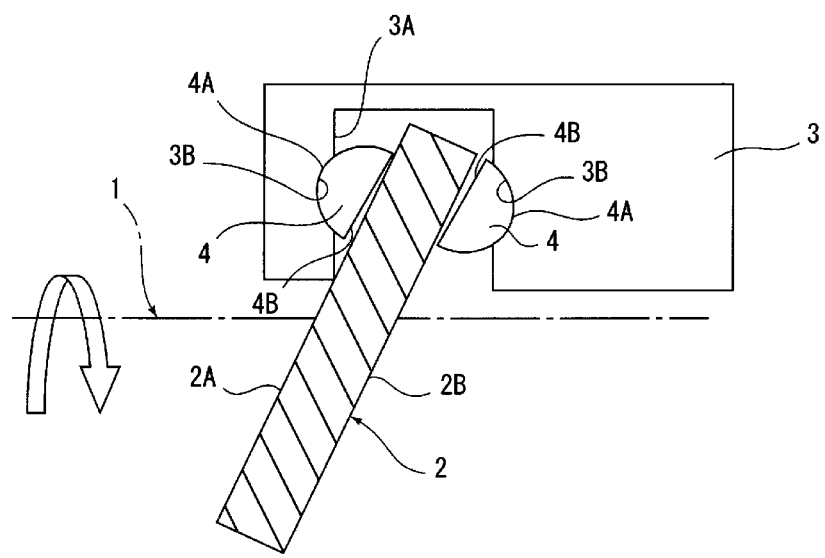
FIG. 1 is a front view of the main parts showing one embodiment of the present invention.

When explaining the present invention with reference to the illustrated embodiments below, FIG. 1 shows the main parts of a swash plate type compressor. The swash plate type compressor is arranged with a disc-shaped swash plate 2 attached to be tilted to an outer peripheral part of a rotary shaft 1, a plurality of pistons 3 arranged along the rotary shaft 1 and wrap the outer peripheral part of the swash plate 2 by a notch part 3A of one end, and a plurality of hemispherical shoes 4 arranged between a pair of hemispherical recess parts 3B, 3B formed within the notch 3A of each piston 3 and a front surface 2A and rear surface 2B of the swash plate 2. The shoe 4 is arranged with a hemispherical surface 4A which latches to the recess part 3B of the piston 3, and a flat end surface 4B which slides with the front surface 2A or rear surface 2B which are sliding surfaces of the swash plate 2. The shoe 4 is comprised from SUJ2, tempered to the hemispherical surface 4A and end surface 4B and subsequently finish processed. When the swash plate 2 rotates by the rotation of the rotary shaft 1,
the hemispherical surface 4A of a pair of shoes 4 and the recess parts 3B, 3B of the piston 3 slide together with the sliding of the front surface 2A of rear surface 2B which are sliding surfaces of the swash plate 2 and the end surface 4B of a pair of shoes 4, thereby each piston 3 is adapted for reciprocated motion along the axial direction of the rotary shaft 1. In addition, when the rotary shaft 1 and the swash plate 2 rotate, lubricating oil is supplied from the inner peripheral part of the swash plate 2 through which the rotary shaft 1 passes through, and the lubricating oil is supplied to the front surface 2A and rear surface 2B which are sliding surfaces together with the rotation of the swash plate 2.

Figure 2:
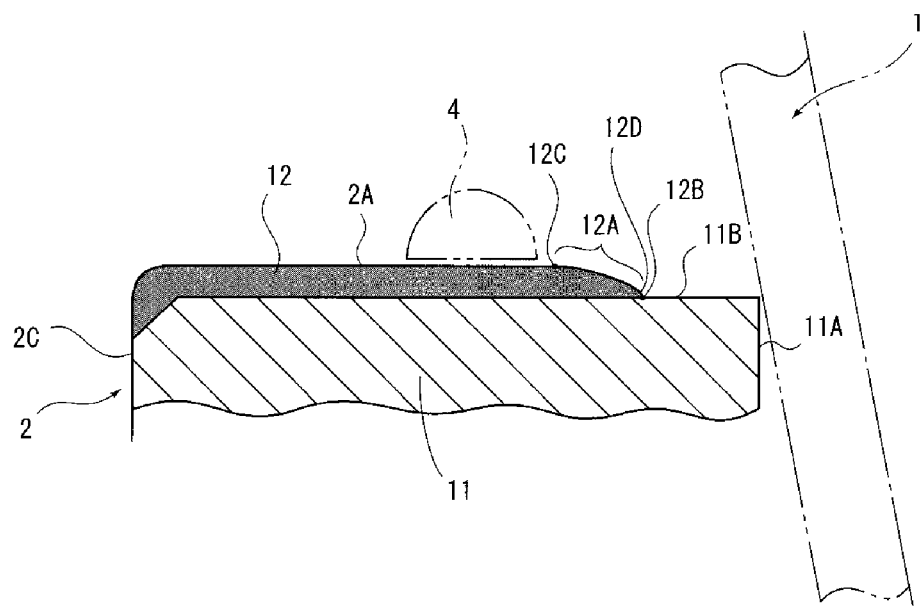
FIG. 2 is a cross-sectional view showing the main parts of the swash plate shown in FIG. 1.
Figure 3:
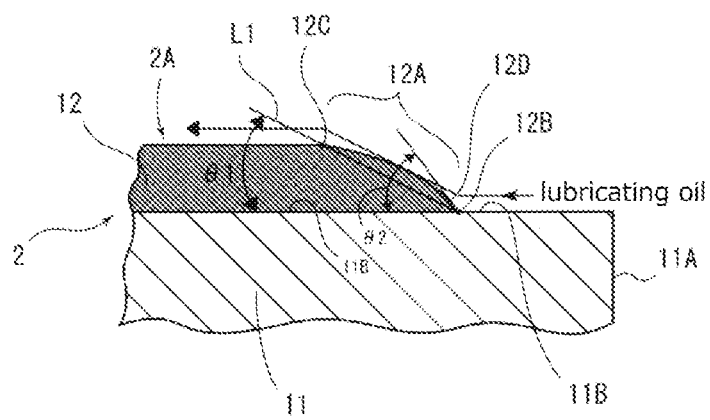
FIG. 3 is an enlarged view of the main parts in FIG. 2.
Figure 4:
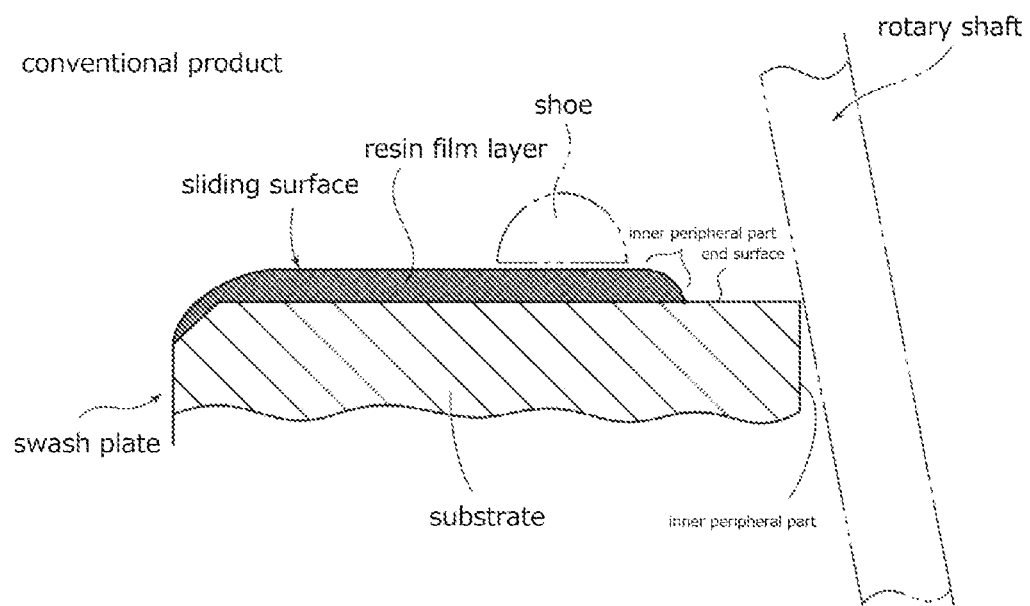
FIG. 4 is a cross-sectional view showing the main parts of a swash plate of a conventional product.
Figure 5:
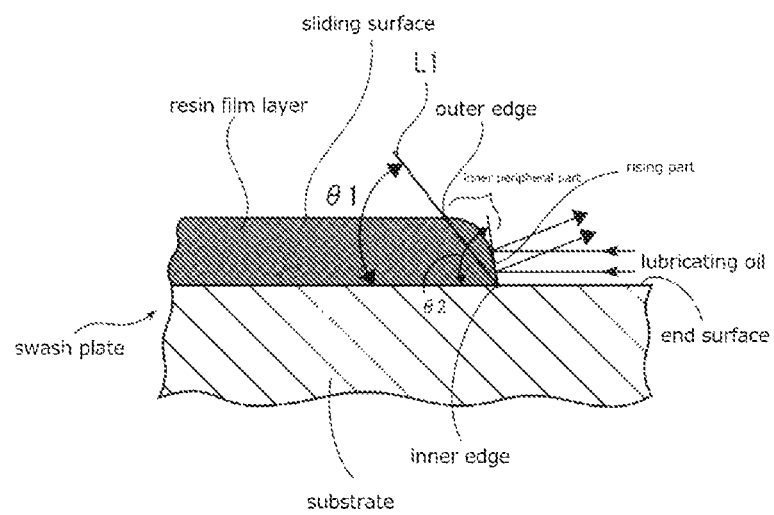
FIG. 5 is an enlarged view of the main parts in FIG. 4.

As is shown in FIG. 2 and FIG. 3, the swash plate 2 of the present embodiment is formed from a disc-shaped substrate 11 drilled with a through-hole 11A at the center through which the rotary shaft 1 passes, and a resin film layer 12 as a coating layer on both end surfaces 11B of the substrate 11. Furthermore, FIG. 2 and FIG. 3 only show the end surface 11B which serves as the front surface 2A side, and the resin film layer 12 which is applied thereto and the rear surface 2B is omitted. The substrate 11 is comprised from an iron-based material and is set to the same thickness throughout. The through-hole 11A of the substrate 11 serves as an inner peripheral part of the swash plate 2. The resin film layer 12 as a coating layer is arranged to cover an area further in an outer direction than the through hole 11A from the outer peripheral part (outer peripheral part 2C of the swash plate 2) of the end surface 11B. Therefore, the end surface 11B which serves as an adjacent outer part of the through hole 11A is exposed in a circumferential direction over the entire area.

Then, in the present embodiment, assuming the swash plate 2 includes the structure described above, the inner peripheral part 12A of the resin film layer 12 becomes a tilted surface which the lubricating oil easily leaps over and due to this, the lubricating oil is easily supplied to the front surface 2A and rear surface 2B which are sliding surfaces. More specifically, in the resin film layer 12 of the present embodiment, the thickness of sections other than the inner peripheral part 12A and outer peripheral part are set to the same thickness, more specifically, set to 2~50 μm. The inner peripheral part 12A server as a tilted surface in which an outer edge 12C which serves an edge part of the inner peripheral part side of the surface 2A (sliding surface) is located in a radial outwards direction with respect to an inner edge 12B which serves as a boundary with the end surface 11B exposed on the substrate 11. In addition, an angle θ1 which is formed between a virtual straight line L1 connecting the inner edge 12B and outer edge 12C of the inner peripheral part 12A and the end surface 11B of the substrate 11 is set to 10° or less. In addition, an angle θ2 which is formed between the rising part 12D serving as adjacent sections of the inner edge 12B and the end surface is set to 20° or less, and an angle formed with the surface 11B in any section place of the inner peripheral part 12A which is a tilted surface is set to less than 90°. In order to obtain a more favorable effect, the angle θ1 is set to 5° or less and the angle θ2 is set to 15° or less. In addition, as a method for covering the end surface 11B of the substrate 11 described above using the resin film layer 12, it is possible to use the following method. That is, it is possible to employ spray coating, roll coating and stamp coating. Furthermore, more preferably, it is preferable to form the resin film layer 12 by spin coating. In the case of spin coating, first a resin coating is coated on both end surfaces 11B of the substrate 11 by roll coating, following this, the substrate 11 is held in a rotation machine and rotated at an appropriate rotation speed for a desired period of time. In this way, the resin coating flows to the outer peripheral side from the inner peripheral side of the end surface of the substrate 11 by centrifugal force, and it is possible to form the resin film layer 12 including the structure described above.

The swash plate 2 of the present embodiment is structured as described above. In the swash plate 2 in the present embodiment as described above, the inner peripheral part 12A of the resin film layer 12 has a tilted surface which the lubricating oil can easily leap. Therefore, when the lubricating oil is supplied from through hole 11A (inner peripheral part of the swash plate 2) of the substrate 11, the lubricating oil leaps over without any obstacle the inner peripheral part 12A of the resin film layer 12 which serves as a gently sloping tilted surface, and is supplied to the front surface 2A and rear surface 2B (sliding surface) which serve as the outer direction side. Therefore, it is possible to prevent front surface 2A and rear surface 2B which are sliding surfaces from insufficient lubrication, therefore, it is possible to satisfactorily prevented seizure of the swash plate 2 due to insufficient lubrication.

Figure 6:
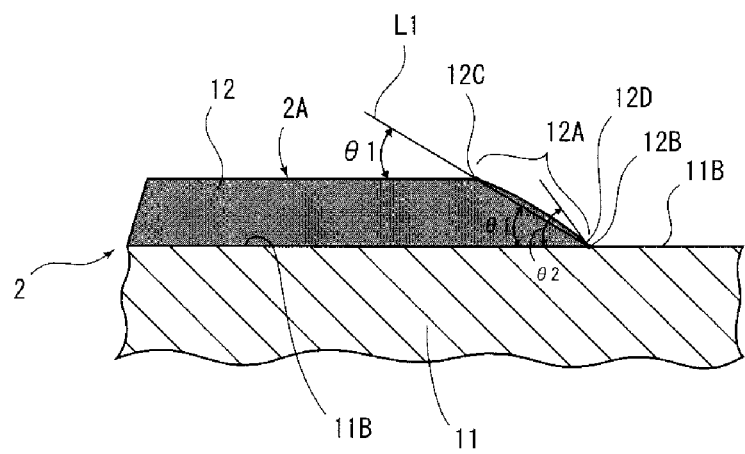
FIG. 6 is a cross-sectional view of the main parts showing a second embodiment of the present invention.

Next, FIG. 6 shows the main parts of the swash plate 2 which is a second embodiment of the present invention. In the second embodiment, as compared with the first embodiment, the radial direction dimensions of the rising part 12D are reduced, and a cross section in the radial direction of the inner peripheral part 12A is a tilted surface which has an roughly arc shape. There is no change in other parts of this structure from that of the first embodiment shown in FIG. 3, and the same number is attached to each member corresponding to the first embodiment. Even in the swash plate 2 of the second embodiment as described above, it is possible to obtain the same advantages effects as the first embodiment.

Figure 7:
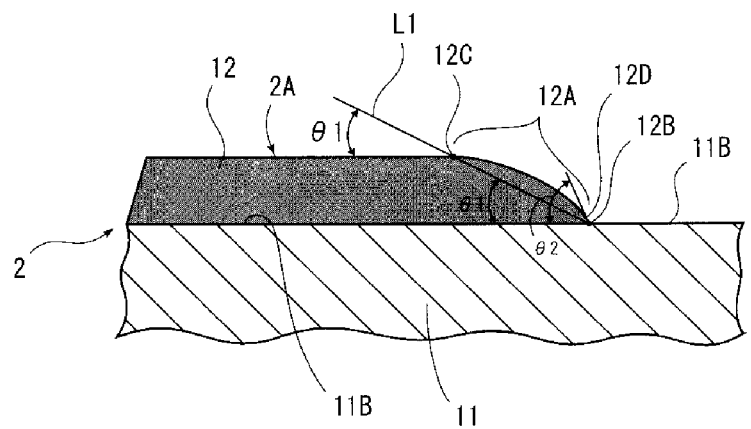
FIG. 7 is a cross-sectional view of the main parts showing a third embodiment of the present invention.

Next, FIG. 7 shows the main parts of the swash plate 2 as a third embodiment of the present invention. The third embodiment is obtained by increasing by three times the amount of enlargement of the inner peripheral part 12A of the resin film layer 12 compared to that of the second embodiment shown in FIG. 6. Therefore, the curvature of the cross section which is a tilted surface has a large roughly arc shape than the second embodiment. There is no change in other parts of this structure from that of the first embodiment, and the same number is attached to each member corresponding to the first embodiment. Even in the third embodiment, it is possible to obtain the same advantages effects as the first embodiment.

Figure 8:
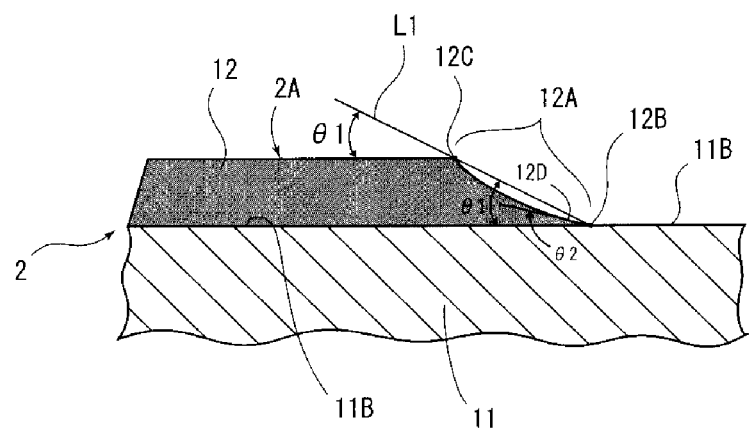
FIG. 8 is a cross-sectional view of the main parts showing a fourth embodiment of the present invention.

Next, FIG. 8 shows the main parts of the swash plate 2 as a fourth embodiment of the present invention. In the fourth embodiment, the inner peripheral part 12A of the resin film layer 12 becomes the roughly arc shaped tilted surface wherein a cross section in a radial direction is recessed downwards. As a result, in the fourth embodiment, the angle θ2 of the rising part 12D is smaller than the angle θ1 which is formed between the virtual straight line L1 and the end surface 11B. There is no change in other parts of this structure from that of the first embodiment shown in FIG. 3 described above, and the same number is attached to each member corresponding to the first embodiment. Even in the fourth embodiment, it is possible to obtain the same advantages effects as the first embodiment.

Figure 9:
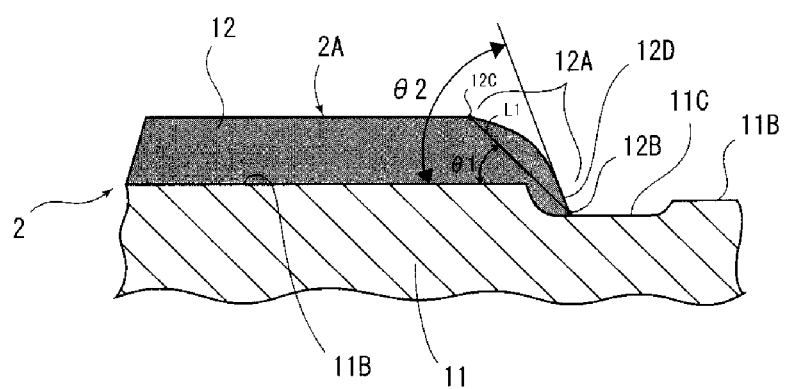
FIG. 9 is a cross-sectional view of the main parts showing a fifth embodiment of the present invention.

Next, FIG. 9 shows the main parts of the swash plate 2 of a fifth embodiment of the present invention. In the fifth embodiment, an annular groove 11C in a circumferential direction is formed in a position adjacent to the inner peripheral part 12A of the resin film layer 12 at the end surface 11B of the substrate 11. Although the bottom part of the annular groove 11C is a flat surface, the cross section of both side walls has a circular arc shape. In addition, the inner peripheral part 12A of the resin film layer 12 is formed to enter the interior of the annular groove 11C beyond one side wall of the annular groove 11C. In the fifth embodiment, due to the relation of forming the annular groove 11C, the angles θ1 and θ2 become larger than that of the embodiments described above. There is no change in other parts of this structure from that of the first embodiment shown in FIG. 3 described above, and the same number is attached to each member corresponding to the first embodiment. Even in the fifth embodiment, it is possible to obtain the same advantages effects as the first embodiment.

Figure 10:
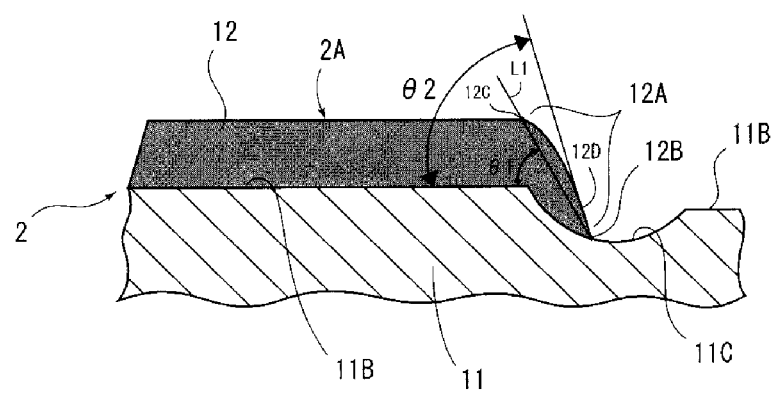
FIG. 10 is a cross-sectional view of the main parts showing a sixth embodiment of the present invention.

Next, FIG. 10 shows the main parts of the swash plate 2 as a sixth embodiment of the present invention. The sixth embodiment is an embodiment similar to the fifth embodiment shown in FIG. 9 wherein the cross sectional shape of the annular groove 11C in the fifth embodiment is formed as a while in an arc shape. In addition, the inner peripheral part 12A of the resin film layer 12 is formed to enter up to a roughly center position of the annular groove 11C. Other parts of this structure are the same as in the fifth embodiment, and the same number is attached to each member corresponding to the fifth embodiment. Even in the sixth embodiment, it is possible to obtain the same advantages effects as the first embodiment. Furthermore, in each embodiment described above, although it is assumed that the resin film layer 12 is a coating layer, a product other than a resin film layer may also be used as a the coating layer.

INDUSTRIAL APPLICATION OF THE INVENTION

The present invention is a swash plate of a swash plate type compressor and can be used as a swash plate arranged with a coating layer serving as a sliding surface.

What is claimed is:

1. A swash plate comprising:
   a disc-shaped substrate; and
   a coating layer applied to a surface of the substrate, the coating layer serving as a sliding surface sliding with a shoe;
   wherein
   an inner peripheral part in the coating layer serves as a tilted surface having an outer edge located in a radial outwards direction, the outer edge serving as an edge part on an inner peripheral part side of the sliding surface with respect to an inner edge serving as a boundary part with an end surface of the substrate, the tilted surface has an angle θ1 formed by a virtual straight line connecting the inner edge and the outer edge with the end surface of the substrate and is set to 10° or less, and an angle θ2 formed by a rising part adjacent to the inner edge with the end surface is set to 20° or less, and an angle formed with the end surface of the substrate in any section of the tilted surface is less than 90°.

2. The swash plate according to claim 1 wherein the coating layer is formed from a resin film layer and the angle θ1 is set to 5° or less and the angle θ2 is set to 15° or less.

3. The swash plate according to claim 1 wherein the tilted surface has a radial direction cross section expanding upwards in a roughly arc shape or has a radial direction arc shaped cross section recessed downwards.

4. The swash plate according to claim 1 wherein an annular shaped groove in a circumferential direction is formed on an end surface serving as an adjacent inner location of the coating layer, and an inner peripheral part of the coating layer is formed to enter the annular shaped groove.

5. The swash plate according to claim 1 wherein a thickness of the coating layer is set to 2~50 um.

* * * * *